Jan. 28, 1958 V. H. WILEY 2,821,566
UNITARY RADIO CHASSIS
Filed Aug. 8, 1952
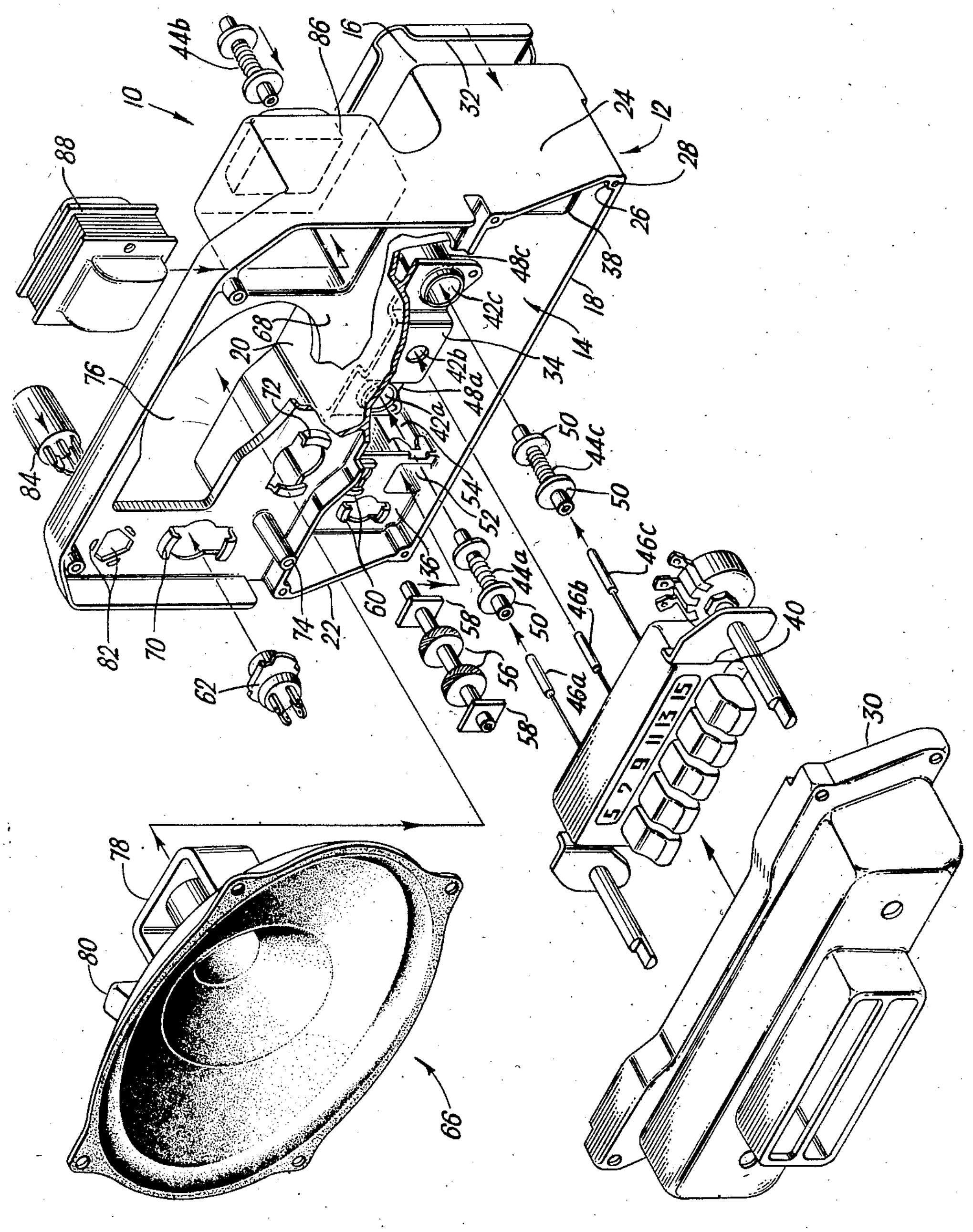
INVENTOR
VERLIS H. WILEY
BY John A. Harvey
ATTORNEY United States Patent Office 2,821,566

Patented Jan. 28, 1958

2,821,566

UNITARY RADIO CHASSIS

Verlis H. Wiley, Kenmore, N. Y., assignor to Sylvania Electric Products Inc., a corporation of Massachusetts Application August 8, 1952, Serial No. 303,277

1 Claim. (Cl. 174—52)

This invention relates to radio chassis constructions, and more particularly to an integral die-cast metallic chassis for mounting the components of high frequency signal amplifying devices.

In assembly line production of chassis for radio receivers and the like, it has heretofore been commonplace to work sheet metal blanks with forming and perforating tools at a number of successive stages to ultimately obtain a particular chassis construction. This technique requires a number of handling operations and constant surveillance, such as by good production controls and close inspection. Necessarily the production costs and scrappage factor have been higher than desired and the top production speed somewhat limited. Costs on occasion are additionally increased by the necessity of reworking, repairing, or replacing one or more of the forming and perforating tools. Even with excellent checking and control, the chassis turned out have often been defective since the multiple handling operations made it difficult to obtain the requisite uniformity and to stay within the prescribed tolerances.

Especially in the mass production of automotive radio equipment, it is essential that certain of the tolerances be held to close values to assure proper fit between the various components in order to minimize both rattling and tone vibration and ignition interference. Further, conventional automotive vibrator-type power supplies have been found to be exceptionally rich in spurious harmonics tending to interfere with normal reception over the broadcast band. Accordingly, the various high frequency components must be tightly shielded to minimize radio frequency leakage. It is apparent that the dual requirements of solid mountings and extremely tight shielding have undesirably increased production costs.

Therefore, it is an object of the present invention to provide a new and improved chassis construction which overcomes at least one or more of the aforesaid difficulties.

It is another object of the present invention to provide a novel chassis which may be manufactured in exceptionally large quantities without the necessity of tool reworking or repair, and at substantially reduced unit cost.

A further object of the present invention is to provide for the mass production of chassis having tolerances uniformly held to extremely close values, without the necessity of rigorous production controls and inspections.

Yet, a still further object of the present invention is the provision of a chassis particularly suitable for solidly mounting the components of automotive radio equipment in a manner minimizing undesirable rattling and tone vibration.

A further object of the present invention is the provision of a novel unitary chassis suitable for rigidly mounting and effectively shielding high frequency components of an electrical apparatus.

A still further object of the present invention is to provide a chassis construction for radios and the like which minimizes the number of parts necessary to solidly mount and effectively shield the high frequency signal amplifying components, yet one that can be manufactured at a relatively high production speed and for a comparatively low cost.

The foregoing and other objects will become apparent from the following brief description of an illustrative embodiment which is particularly suitable for automobile radios. Certain objects of the present invention are realized by the provision of a die-cast metallic housing having an open front and back and cast with one or more integral internal chassis plates. These internal chassis plates are each constructed compactly to support the several components of the radio frequency, intermediate frequency and audio frequency stages of the radio as well as the power-supply components. Preferably each chassis plate is integrally formed with socket mounts, molded apertures, radio-frequency shields and the like, making it possible to rigidly support the various components of a stage and to effectively shield and isolate certain components from each other.

Since the entire chassis is an integral casting made in a single operation, it is possible to hold all tolerances to extremely close values, and to minimize the possibility of mistakes inherent in multiple handling operations. Further, the dies are virtually indestructible and make it commercially feasible to produce limitless quantities of a desired uniformity and at low cost. In addition, the integral formation of the various mounts, shields and the like result in substantial savings in cost and labor, while the decreased number of parts lessens the risk of rattling and tone vibration. Further, since the radio frequency shielding is unitary, the possibility of radio frequency leakage is very greatly reduced due to the elimination of defective or leakage joints frequently occurring between shields and chassis of conventional structures.

The present invention will be best understood by reference to the following detailed description of the illustrative embodiment, when taken in conjunction with the drawing wherein the single feature is an exploded perspective view of a chassis construction according to the present invention.

Referring now to the drawing, there is shown the die-cast unitary chassis 10 of the present invention constructed to rigidly mount and shield the components of a radio receiver of the type employed in automotive vehicles. Although the chassis 10 has been shown constructed for this particular purpose, it is to be understood that similar constructions may be used in a wide range of applications wherever it is desirable firmly to support a number of electrical components and to effectively shield certain of the supported components.

The chassis 10 is preferably fabricated of zinc and formed in a single die-casting operation in accordance with principles and practices well understood, per se. Accordingly, a detailed description of the die construction and the casting operation are dispensed with as unnecessary. For the present purposes, it is sufficient to point out that the quantities which may be produced by a single die are almost limitless and merely require periodic shining up or polishing of the die or mold. Through this integral casting technique, all tolerances are inherently closely held to prescribed values and uniformity is obtained throughout production.

The die-cast chassis 10 includes a substantially rectangular housing 12, having an open front 14, and an open back 16. The housing is formed by the integral lower and upper horizontal walls 18 and 20, interconnected by the vertical end walls 22, 24. Adjacent to the line of joinder of the respective walls, the housing 12 is formed with transverse beads 26 provided with threaded screw holes 28 for securing the front and back covers 30, 32 in place.

The housing 12 is integrally formed with a number of internal chassis plates 34, 36 and 38 for mounting the radio-frequency and intermediate-frequency stages of the radio receiver. The chassis plate 34 depends from the upper wall of the housing 12 and is spaced rearwardly from the open front 14 thereof to permit the push button assembly 40 to be accommodated within the housing 12 forwardly of the plate 34. The chassis plate 34 is formed with molded apertures **42*a*, 42*b* and 42*c* for receiving the radio-frequency tuned coils 44*a*, 44*b*, 44*c* associated with the radio-frequency amplifier and converter stages, the respective coils being tuned by the iron-core tuning slugs 46*a*, 46*b*, 46*c*. Formed integrally with the chassis plate 34 and opening into the molded apertures 42*a* and 42*c* are the respective cylindrical shields 48*a* and 48*c* for receiving and enclosing the tuned coils 44*a* and 44*c*. As clearly illustrated, the external diameters of the supporting discs 50 of the coils 44*a*, 44*c* are approximately equal to the internal diameter of the shields 48*a*, 48*c* to provide adequate support for the coils. In the illustrative embodiment the coil 44*b* has not been shielded since it is positioned on the back side of the plate 34 where it is adequately shielded from the coils 44*a*, 44*c* by the shields 48*a*, 48*c*** as is apparent.

The end chassis plates 36, 38 are spaced forwardly of the plate 34 and formed as diaphragms integrally with the adjacent walls of the housing 12. The end chassis plate 36 is formed with one or more molded apertures 52 and integral shield housings 54 to receive and enclose intermediate frequency transformers, such as that identified by the numeral 56, having substantially square end supports 58 which are dimensioned to engage the inner walls of the shield 54. In addition, the chassis plate may be formed with a plurality of apertures and integral socket securing brackets 60 for receiving and securing tube sockets of the type exemplified by the socket 62, thus permitting the compact mounting of the entire intermediate-frequency amplifier stage or stages on a single chassis plate. Similarly, the end chassis plate 38, only one corner of which is shown, may be provided with the necessary integral mounting fixtures and socket apertures and securing for the various components of the radio frequency stage and the oscillator-converter stage. When the die-cast front cover or nose 30 and the stamped sheet-metal back cover 32 are screwed into place, all the components of the high-frequency stages will be supported within the housing 12 and adequately shielded from each other as wel as from external sources of ignition interference and other electrical noise and also are well shielded from the vibrator-type power supply now to be described.

In order to mount the various components of the power supply, the audio stage, and the loudspeaker assembly 66 an integral extending chassis plate 68 is cast with the housing 12 substantially normal to the upper wall 20. The chassis plate 68 is formed with various apertures and integral fixtures, such as the socket mounts 70, 72 for the tube and vibrator bases 62, mounting studs 74 for the loudspeaker assembly, a molded key-shaped aperture 76 to receive the permanent magnet 78 and output transformer 80 of the loudspeaker assembly 66, the apertures

82 for receiving and mounting the electrolytic condenser 84, and the open-ended integrally formed rectangular shield housing 86 for the power transformer 88.

The power transformer 88 is conventionally energized from a vibrator, not shown, which necessarily generates spurious harmonic frequencies or "hash" fixed by the vibrator frequency. As previously pointed out this "hash" would normally tend to interfere undesirably with reception if it were not for the careful shielding of the high-frequency amplifier circuits from the power supply by the integral housing and shields described. It is to be noted that the requirements of perfect shielding is not as critical with respect to the detector or audio-frequency amplifier stages and, accordingly, the circuit components of the latter may conveniently be mounted on chassis plate 68.

From the foregoing, the numerous advantages and applications of an integral chassis construction according to the present invention should readily suggest themselves to those skilled in the art. By die casting a chassis with integral shields, socket mounts, mounting lugs and the like, it is possible to obtain a precise and standardized construction wherein impaired raido-frequency shielding, rattling, faulty supports, and the like are substantially eliminated. At the same time, it is possible to effect savings in cost due to the reduction in the number of component parts, the elimination of multiple production controls and inspections, the maintenance of consistently close tolerances in large production runs, and the relatively long trouble-free tool life.

While there have been described what are at present considered to be the preferred embodiments of the invention, it will be apparent to those skilled in the art that various changes and modifications may be made therein without departing from the invention. Consequently, the appended claim should be interpreted broadly, as may be consistent with the spirit and scope of the invention.

What I claim is:

A chassis construction having a unitary housing comprising a mounting plate and surrounding walls, combined support and shielding means for electrical components formed as part of said mounting plate, at least one of said shielding means being of a size to house one of said electrical components, an electrical component having support members snugly engaging the walls of said shielding means and supported within and shielded by said shielding means, and front and back cover plates over at least some of the electrical components and attached to the walls.

References Cited in the file of this patent

UNITED STATES PATENTS

| | | |
|---|---|---|
| 1,816,718 | Bond | July 28, 1931 |
| 2,175,025 | Hooven | Oct. 3, 1939 |
| 2,411,528 | Dodington | Nov. 26, 1946 |
| 2,468,727 | Bauman | May 3, 1949 |

FOREIGN PATENTS

| | | |
|---|---|---|
| 350,188 | Great Britain | June 11, 1931 |
| 834,981 | France | Dec. 8, 1938 |